(12) United States Patent
Lee et al.

(10) Patent No.: US 11,343,062 B2
(45) Date of Patent: May 24, 2022

(54) APPARATUS AND METHOD FOR CANCELLING SELF-INTERFERENCE SIGNAL

(71) Applicant: ELECTRONICS AND TELECOMMUNICATIONS RESEARCH INSTITUTE, Daejeon (KR)

(72) Inventors: Je-Won Lee, Daejeon (KR); Joon-Young Jung, Daejeon (KR); Dong-Joon Choi, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 112 days.

(21) Appl. No.: 16/870,241

(22) Filed: May 8, 2020

(65) Prior Publication Data

US 2021/0203471 A1 Jul. 1, 2021

(30) Foreign Application Priority Data

Dec. 26, 2019 (KR) .......................... 10-2019-0175455

(51) Int. Cl.
*H04L 5/14* (2006.01)
*H04B 15/02* (2006.01)
(Continued)

(52) U.S. Cl.
CPC .......... *H04L 5/1461* (2013.01); *H04B 15/02* (2013.01); *H04J 13/0062* (2013.01); *H04L 25/0212* (2013.01); *H04L 25/14* (2013.01)

(58) Field of Classification Search
CPC ... H04L 5/1461; H04L 25/0212; H04L 25/14; H04L 25/0224; H04L 25/0328;
(Continued)

(56) References Cited

U.S. PATENT DOCUMENTS 8,224,242 B2 7/2012 Chang
9,748,990 B2 8/2017 Wu et al.
(Continued)

FOREIGN PATENT DOCUMENTS

| CN | 107210907 | 9/2017 |
| KR | 10-1357923 | 2/2014 |

*Primary Examiner* — Pao Sinkantarakorn
*Assistant Examiner* — Kabir U Jahangir
(74) *Attorney, Agent, or Firm* — Kile Park Reed & Houtteman PLLC

(57) ABSTRACT

Disclosed herein are an apparatus and method for removing a self-interference signal. The apparatus includes one or more processors and executable memory for storing at least one program executed by the one or more processors. The at least one program receives an upstream signal for removing self-interference, generates a downstream signal for channel estimation, replicates a self-interference signal in a time domain and a self-interference signal in a frequency domain using the upstream signal and the downstream signal, and removes the self-interference signal from the upstream signal using the replicated self-interference signal in the time domain and the replicated self-interference signal in the frequency domain.

6 Claims, 14 Drawing Sheets

(51) Int. Cl.
*H04L 25/14* (2006.01)
*H04J 13/00* (2011.01)
*H04L 25/02* (2006.01)

(58) Field of Classification Search
CPC ..... H04L 25/03292; H04B 15/02; H04B 3/23; H04J 13/0062; H04J 11/0023
See application file for complete search history.

(56) References Cited

U.S. PATENT DOCUMENTS

| | | |
|---|---|---|
| 10,033,513 B2 | 7/2018 | Wu et al. |
| 2016/0233903 A1* | 8/2016 | Wu ..................... H04J 13/0062 |
| 2016/0294532 A1* | 10/2016 | Masmoudi ............ H04L 5/1461 |
| 2016/0315754 A1* | 10/2016 | Wu ..................... H04L 25/0228 |
| 2017/0317704 A1 | 11/2017 | Noh et al. |
| 2019/0109652 A1* | 4/2019 | Kim ........................ H04B 15/02 |
| 2019/0181897 A1 | 6/2019 | Baek et al. |
| 2020/0295912 A1* | 9/2020 | Venkatraman .......... H04L 5/143 |

* cited by examiner

APPARATUS AND METHOD FOR CANCELLING SELF-INTERFERENCE SIGNAL

CROSS REFERENCE TO RELATED APPLICATION

This application claims the benefit of Korean Patent Application No. 10-2019-0175455, filed Dec. 26, 2019, which is hereby incorporated by reference in its entirety into this application.

BACKGROUND OF THE INVENTION

1. Technical Field

The present invention relates generally to technology for removing a self-interference signal, and more particularly to technology for removing a self-interference signal generated in an in-band full-duplex system and generating a signal for channel estimation and estimation technology.

2. Description of the Related Art

These days, the volume of upstream traffic is continually increasing due to cloud services, uploading of high-quality video, real-time games, real-time video-streaming services, and the like.

In order to accommodate the increasing volume of upstream traffic in a Hybrid Fiber Coaxial (HFC) network, the Full-Duplex Data Over Cable Service Interface Specification 3.1 (Full Duplex DOCSIS 3.1), which sets forth a configuration in which downstream traffic and upstream traffic simultaneously use the same frequency band, has been published.

In a frequency band operated in a full-duplex mode, a Cable Modem Termination System (CMTS) may receive a downstream signal transmitted thereby simultaneously with receiving an upstream signal transmitted by a Cable Modem (CM). Here, the downstream signal transmitted by the CMTS itself acts as interference in demodulation of the upstream signal, and is referred to as a self-interference signal.

Because the power of the received self-interference signal is very large compared with the power of the upstream signal, only when the self-interference signal is correctly removed may the upstream signal be demodulated. To this end, research for removing a self-interference signal in both analog and digital domains is being carried out. In the analog domain, methods in which, although the received self-interference signal is not completely blocked, the signal power thereof is reduced using a circulator, are being researched. In the digital domain, methods in which a self-interference signal is replicated by estimating nonlinear distortion generated in an amplifier and a Channel Impulse Response (CIR), after which the received self-interference signal is removed, are being researched.

Meanwhile, Korean Patent No. 10-1357923, titled "Apparatus and method for canceling self-interference and relay system for the same" discloses a self-interference cancellation apparatus configured to acquire a channel value from a signal received via a self-interference channel and to relay a transmission signal of an uplink or a downlink from which self-interference is cancelled based on the channel value.

SUMMARY OF THE INVENTION

An object of the present invention is to remove a self-interference signal through channel estimation even when an upstream signal is received.

In order to accomplish the above object, an apparatus for removing a self-interference signal according to an embodiment of the present invention includes one or more processors and executable memory for storing at least one program executed by the one or more processors. The at least one program may receive an upstream signal for removing self-interference, generate a downstream signal for channel estimation, replicate a self-interference signal in a time domain and a self-interference signal in a frequency domain using the upstream signal and the downstream signal, and remove the self-interference signal from the upstream signal using the replicated self-interference signal in the time domain and the replicated self-interference signal in the frequency domain.

Here, the downstream signal may have an autocorrelation characteristic for channel estimation.

Here, the upstream signal and the downstream signal may be combined through a circulator.

Here, the at least one program may estimate a channel impulse response from a signal in which the upstream signal and the downstream signal are combined.

Here, the at least one program may perform convolution on the channel impulse response and the downstream signal and again receive a difference value between an output value acquired by performing convolution and the signal in which the upstream signal and the downstream signal are combined, thereby repeatedly estimating the channel impulse response.

Here, the at least one program may replicate the self-interference signal in the time domain by performing convolution on an estimate of the channel impulse response and the downstream signal.

Here, the at least one program may replicate the self-interference signal in the frequency domain by performing Fourier transform on the estimate of the channel impulse response and the downstream signal.

Also, in order to accomplish the above object, a method for removing a self-interference signal, performed by an apparatus for removing the self-interference signal, according to an embodiment of the present invention includes receiving an upstream signal for removing self-interference, generating a downstream signal for channel estimation, and replicating a self-interference signal in a time domain and a self-interference signal in a frequency domain using the upstream signal and the downstream signal and removing the self-interference signal from the upstream signal using the replicated self-interference signal in the time domain and the replicated self-interference signal in the frequency domain.

Here, the downstream signal may have an autocorrelation characteristic for channel estimation.

Here, the upstream signal and the downstream signal may be combined through a circulator.

Here, removing the self-interference signal may be configured to estimate a channel impulse response from a signal in which the upstream signal and the downstream signal are combined.

Here, removing the self-interference signal may be configured to perform convolution on the channel impulse response and the downstream signal and to again receive a difference value between an output value acquired by performing convolution and the signal in which the upstream signal and the downstream signal are combined, thereby repeatedly estimating the channel impulse response.

Here, removing the self-interference signal may be configured to replicate the self-interference signal in the time domain by performing convolution on an estimate of the channel impulse response and the downstream signal.

Here, removing the self-interference signal may be configured to replicate the self-interference signal in the frequency domain by performing Fourier transform on the estimate of the channel impulse response and the downstream signal.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
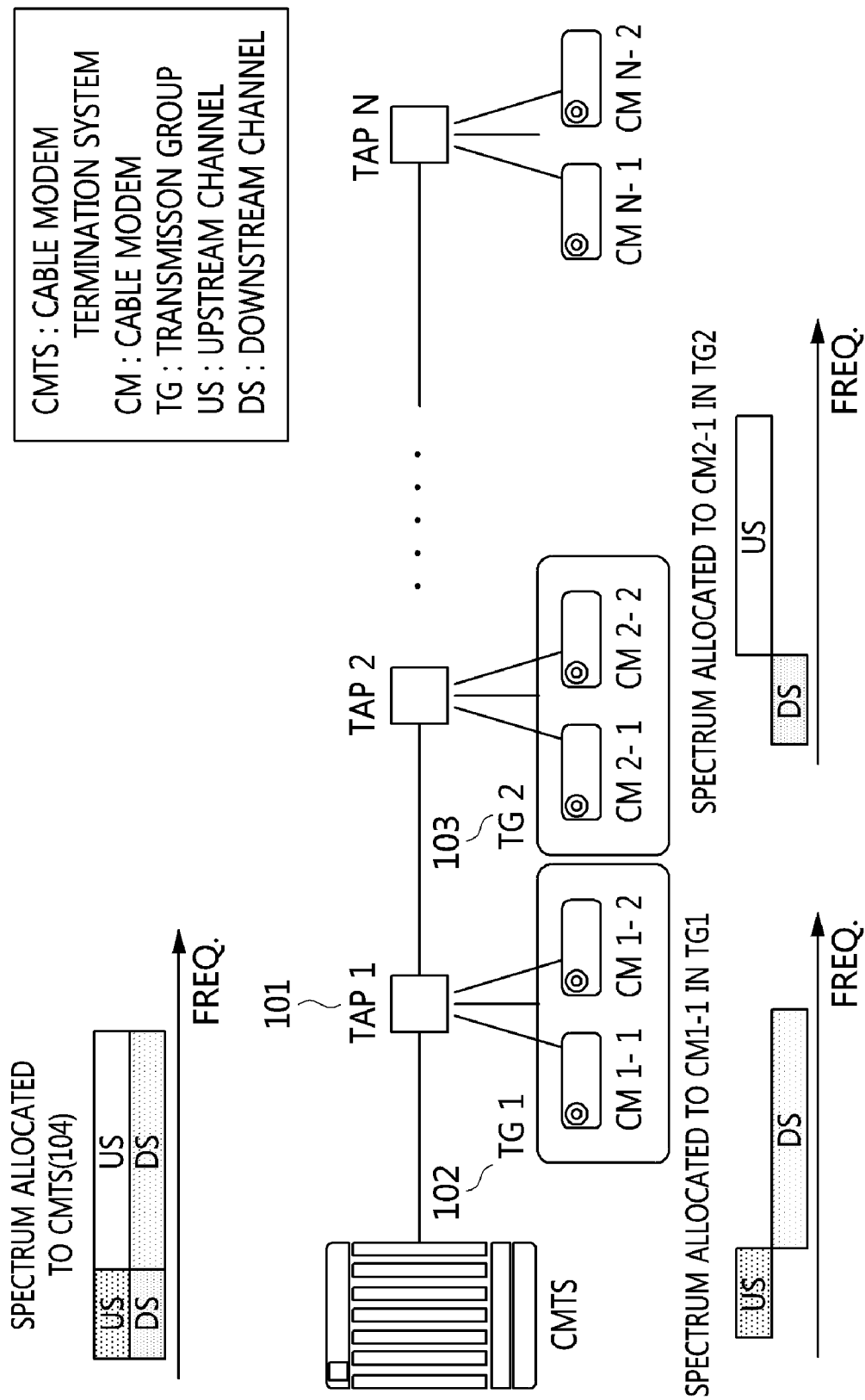
FIG. 1 is a view illustrating a full-duplex communication system according to an embodiment of the present invention.

The present invention will be described in detail below with reference to the accompanying drawings. Repeated descriptions and descriptions of known functions and configurations which have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Throughout this specification, the terms "comprises" and/or "comprising", and "includes" and/or "including", specify the presence of stated elements but do not preclude the presence or addition of one or more other elements unless otherwise specified.

Hereinafter, a preferred embodiment of the present invention will be described in detail with reference to the accompanying drawings.

Figure 2:
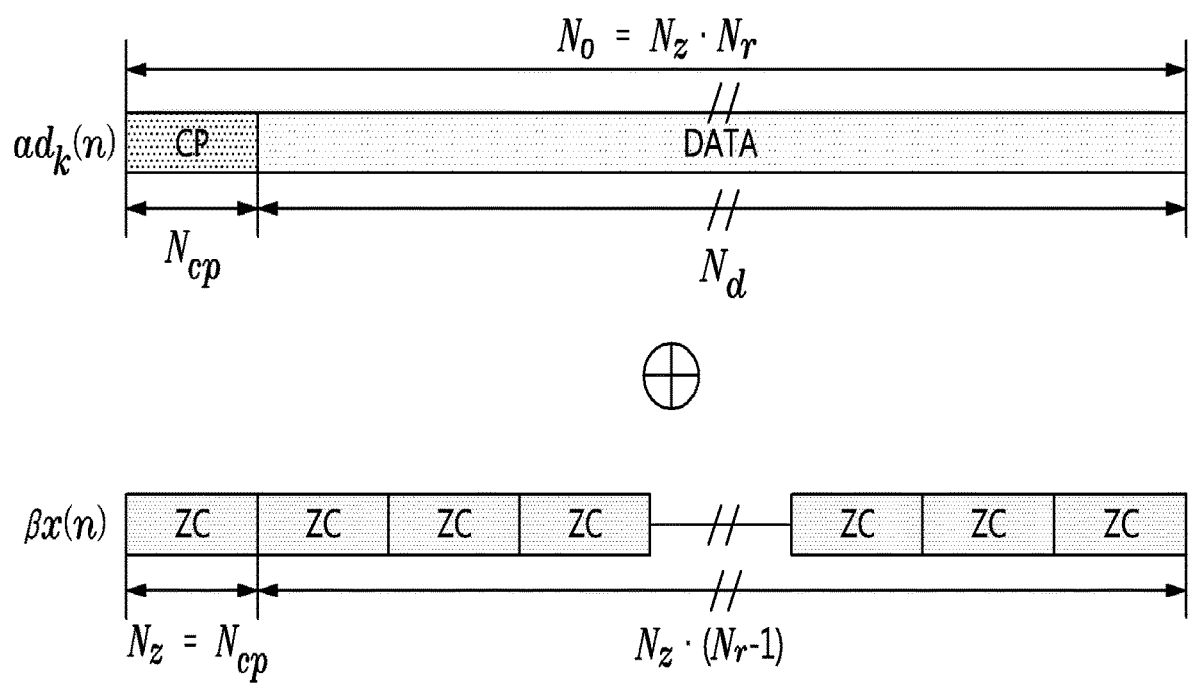
FIG. 2 is a view illustrating the structure of a downstream signal according to an embodiment of the present invention.

FIG. 1 is a view illustrating a full-duplex communication system according to an embodiment of the present invention. FIG. 2 is a view illustrating the structure of a downstream signal according to an embodiment of the present invention.

Referring to FIG. 1, a full-duplex DOCSIS 3.1 system, which is an example of a full-duplex communication system according to an embodiment of the present invention, is illustrated.

An environment in which the full-duplex DOCSIS 3.1 system operates is assumed to be a network in which no amplifier is present on the coaxial cable.

Generally, in a full-duplex DOCSIS 3.1 system, a transmission group TG may be configured based on a tap 101. When upstream/downstream frequency bands are allocated to each of a transmission group 1 TG1 102 and a transmission group 2 TG2 103, as illustrated in FIG. 1, the frequency spectrum 104 of a Cable Modem Termination System (CMTS) is configured such that the downstream band and the upstream band are allocated so as to be simultaneously used.

In order to demodulate an upstream signal received by the CMTS, first, a self-interference signal may be removed. A downstream signal transmitted from the CMTS may be received by the CMTS itself because the signal is reflected from a terminal that connects a tap with another tap. This signal may be referred to as an echo or an echo channel. Also, nonlinear distortion may occur when the downstream signal passes through an amplifier via a Digital-to-Analog Converter (DAC). In order to correctly replicate such a self-interference signal, it is necessary to accurately estimate these distortion phenomena. In the present invention, a description will be made with an emphasis on the method for estimating an echo channel.

Because the full-duplex DOCSIS 3.1 system according to an embodiment of the present invention is based on Orthogonal Frequency-Division Multiplexing (OFDM), an echo channel may be estimated in time and frequency domains.

Here, the full-duplex DOCSIS 3.1 system may require a code having good autocorrelation performance, such as a Zadoff-Chu sequence, in order to improve channel estimation performance in the time domain. The full-duplex DOCSIS 3.1 system may estimate a channel using a pilot signal for channel and frequency offset estimation in the frequency domain. In order to improve channel estimation performance, the CMTS may estimate an echo channel in a training section in which no upstream signal is present. Also, because the channel may vary over time and according to changes in the network environment, the CMTS may arrange the training section at regular intervals and estimate the channel. During the training section generated at regular intervals, CMs included in the transmission group managed by the CMTS wait without transmitting upstream data until the training section ends.

In the present invention, after the initial training for estimating the echo channel, the echo channel is estimated in the time domain without setting a periodic training section, and a self-interference signal may be removed based thereon.

An equation for generating a Zadoff-Chu sequence having a zero autocorrelation characteristic is represented as Equation (1):

$$x(n) = \begin{cases} e^{\left(\frac{-j\pi u n(n+1)}{N_z}\right)} & N_z: \text{odd} \\ e^{\left(\frac{-j\pi u n^2}{N_z}\right)} & N_z: \text{even} \end{cases} \quad (1)$$

$$n = 0, 1, \ldots, N_z - 1$$

$$x(n) = x(n + N_z)$$

Here, i denotes the root of the sequence, which has an integer value and corresponds to a periodic signal with a period $N_z$.

An ideal received signal having no white noise in the time domain may be represented as Equation (2):

$$y(n)=h(n)*x(n)=\sum_{i=0}^{N_l-1} h(i)x(n-i) \quad (2)$$

Here, x(n) denotes a transmitted signal, y(n) denotes a received signal, h(n) denotes an echo channel, and $N_l$ denotes a channel length.

Equation (3) shows an autocorrelation function for channel estimation:

$$r(\tau) = \frac{1}{N_z} \sum_{n=0}^{N_z-1} y(n)x^*(n-\tau)$$

$$= \frac{1}{N_z} \sum_{n=0}^{N_z-1} \sum_{n=0}^{N_l-1} h(i)x(n-i)x^*(n-\tau) \quad (3)$$

$$= \frac{1}{N_z} \sum_{n=0}^{N_l-1} h(i) \sum_{n=0}^{N_z-1} x(n-i)x^*(n-\tau)$$

When it is assumed that the transmitted signal x(n) is a Zadoff-Chu sequence, the length of which is an even number, in Equation (3), the autocorrelation function may be calculated as shown in Equation (4):

$$\sum_{n=0}^{N_z-1} x(n-i)x^*(n-\tau) = \quad (4)$$

$$\sum_{n=0}^{N_z-1} e^{\left(\frac{-j\pi u n(n+i)^2}{N_z}\right)} e^{\left(\frac{-j\pi u(n-\tau)^2}{N_z}\right)} = \sum_{n=0}^{N_z-1} e^{\left(\frac{-j\pi u(\tau-i)(2n-i-\tau)}{N_z}\right)} = \begin{cases} N_z & i = \tau \\ 0 & i \neq \tau \end{cases}$$

When Equation (4) is substituted into Equation (3), Equation (5) may be acquired as follows:

$$r(\tau) = \frac{1}{N_z} \sum_{i=0}^{N_l-1} h(n) N_z \delta(i-\tau) = h(\tau) \quad (5)$$

Through Equation (5), it is confirmed that, when an echo channel is estimated using a Zadoff-Chu sequence in an ideal environment, the echo channel may be perfectly estimated. Using a channel impulse response estimated using the Zadoff-Chu sequence during the initial training section, the CMTS may remove a self-interference signal in the time or frequency domain.

Even in an environment in which an upstream signal and a downstream signal are simultaneously received, a Zadoff-Chu sequence may be transmitted so as to be synchronized with the downstream signal in order to estimate an echo channel using the Zadoff-Chu sequence. Equation (6) shows a downstream signal proposed in the present invention.

$$s_k(f)=\alpha d_k(n)+\beta x(n) \quad (6)$$

Here, $d_k(n)$ denotes the k-th OFDM downstream signal, x(n) denotes a Zadoff-Chu sequence, and $\alpha$ and $\beta$ denote coefficients for normalization of signal power. The length of $d_k(n)$, which is $N_o$, is $N_{cp}+N_d$, where $N_{cp}$ is the length of a cyclic prefix (CP) and $N_d$ is a data length. Here, $N_o$ is defined as a multiple of $N_z$, that is, $N_z$ multiplied by $N_r$, and may be represented as shown in Equation (7):

$$N_o=N_z \cdot N_r \quad (7)$$

When $N_z$ equals to $N_{cp}$ the proposed downstream signal may be represented as shown in FIG. 2 using Equation (6) and Equation (7).

Referring to FIG. 2, a length of $N_z$ may be equal to or less than $N_{cp}$.

The received signal in the time domain may be represented as shown in Equation (8):

$$y_k(n)=h_k(n)*s_k(n)+u(n)+z(n) \quad (8)$$

Here, $h_k(n)$ denotes an echo channel for the k-th OFDM symbol, u(n) denotes the upstream OFDM symbol, and z(n) denotes white noise.

When an autocorrelation function using a Zadoff-Chu sequence is calculated for all of the signals in Equation (8), the equation becomes very complicated. Therefore, in order to simplify the equation, the upstream OFDM symbol and the white noise are excluded, whereby Equation (9) may be acquired as follows:

$$r_k(\tau) = \frac{1}{N_r} \sum_{j=0}^{N_r-1} \frac{1}{N_z} \sum_{n=0}^{N_z-1} y_k(n + j \cdot N_z)x^*(n + j \cdot N_z - \tau) \quad (9)$$

Using the cyclicity of the Zadoff-Chu sequence, Equation (10) may be acquired as follows:

$$\frac{1}{N_r N_z} \sum_{j=0}^{N_r-1} \sum_{n=0}^{N_z-1} h_k(n + j \cdot N_z) * \alpha d_k(n + j \cdot N_z)x^*(n - \tau) + \quad (10)$$

$$\frac{1}{N_r N_z} \sum_{j=0}^{N_r-1} \sum_{n=0}^{N_z-1} h_k(n + j \cdot N_z) * \beta x(n)x^*(n - \tau) =$$

$$\beta h_k(\tau) + \text{interference} = \tilde{h}_k(\tau)$$

In Equation (10), the equation including the k-th OFDM downstream signal acts as interference in the estimation of the echo channel, thereby degrading the echo channel estimation performance. However, because the CMTS is aware of the k-th OFDM downstream signal, the interference may be reduced as shown in Equation (11) using the channel impulse response, $\tilde{h}_k(\tau)$, calculated in Equation (10).

$$c_{k,i}(n)=y_k(n)-\tilde{h}_{k,i}(n)*\alpha d_k(n)=\{h_k(n)-\tilde{h}_{k,i}(n)\}*\alpha d_k(n)+h_k(n)*\beta x(n) \quad (11)$$

Here, i denotes the number of repetitions.

When the autocorrelation function for the echo channel is calculated using the result of Equation (11), the result may be represented as shown in Equation (12):

$$v_{k,i}(\tau) = \quad (12)$$

$$\frac{1}{N_r N_z}\sum_{j=0}^{N_r-1}\sum_{n=0}^{N_z-1}\{h_k(n+j\cdot N_z)-\tilde{h}_{k,i}(n+j\cdot N_z)\}*\alpha d_k(n+j\cdot N_z)$$

$$x^*(n-\tau)+$$

$$\frac{1}{N_r N_z}\sum_{j=0}^{N_r-1}\sum_{n=0}^{N_z-1}h_k(n+j\cdot N_z)*\beta x(n)x^*(n-\tau) =$$

$$\beta h_k(\tau) + \text{reduced interference} = \tilde{h}_{k,i+1}(\tau)$$

Here, the present invention may improve estimation performance by repeatedly estimating the echo channel or using the average of the estimated channel values.

The signal received after the self-interference signal is removed in the time domain may be represented as shown in Equation (13), and the signal received after the self-interference signal is removed in the frequency domain may be represented as shown in Equation (14).

$$\tilde{y}_k(n)=y_k(n)-\tilde{h}_{k,i}(n)*s_k(n) \quad (13)$$

$$\tilde{Y}_k(p)=Y_k(p)-\tilde{H}_{k,i}(p)S_k(p) \quad (14)$$

Figure 3:
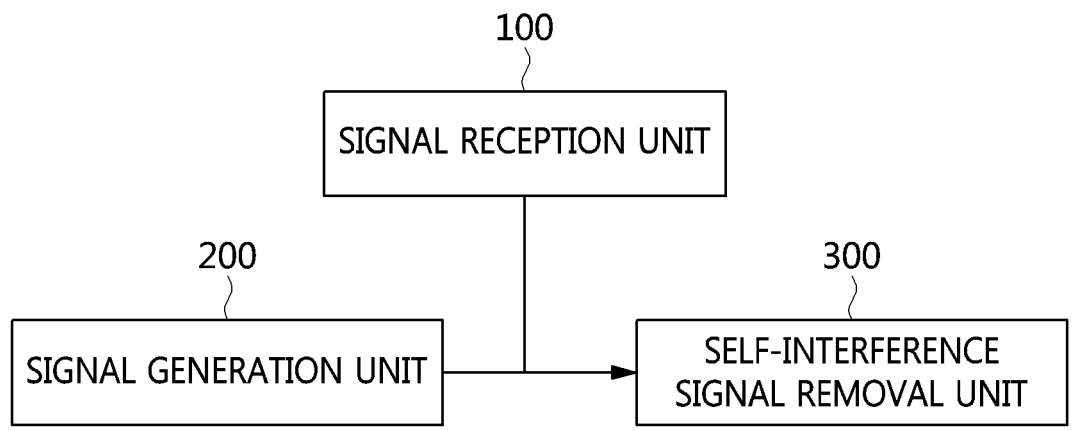
FIG. 3 is a block diagram illustrating an apparatus for removing a self-interference signal according to an embodiment of the present invention.
Figure 4:
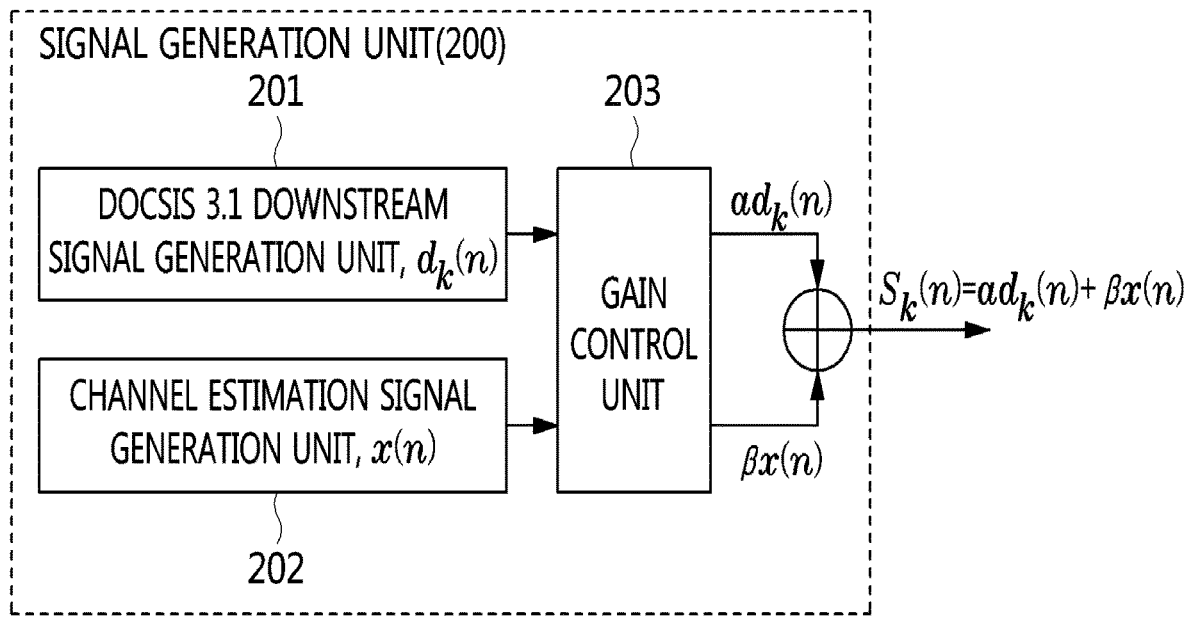
FIG. 4 is a block diagram specifically illustrating an example of the signal generation unit illustrated in FIG. 3.
Figure 5:
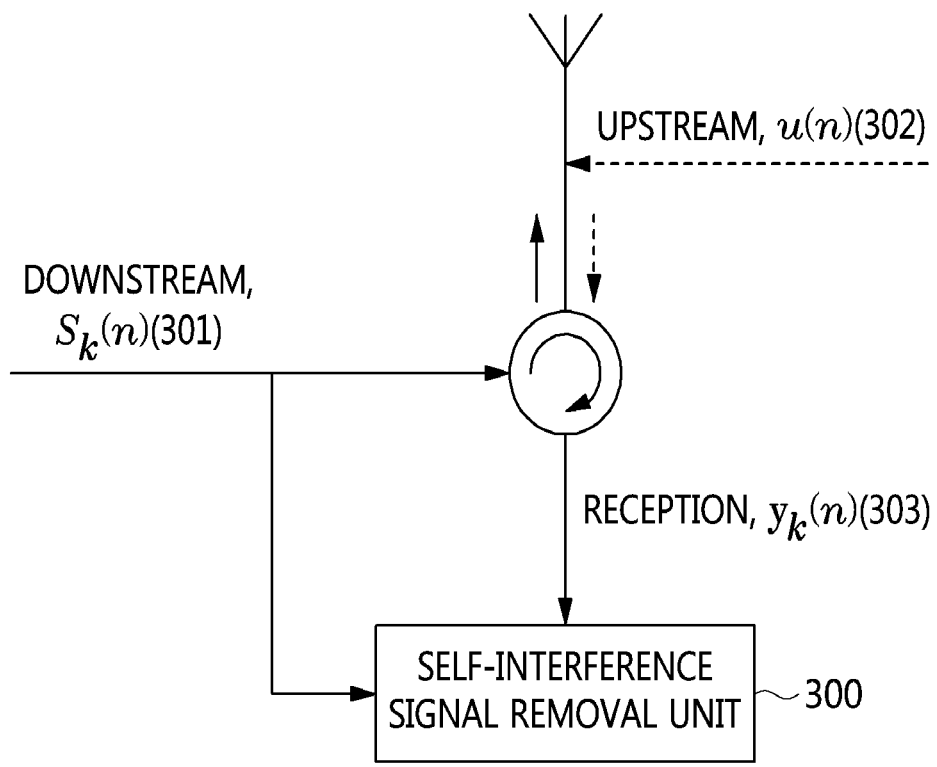
FIG. 5 is a block diagram specifically illustrating an example of the self-interference signal removal unit that receives a signal from the signal reception unit illustrated in FIG. 3.
Figure 6:
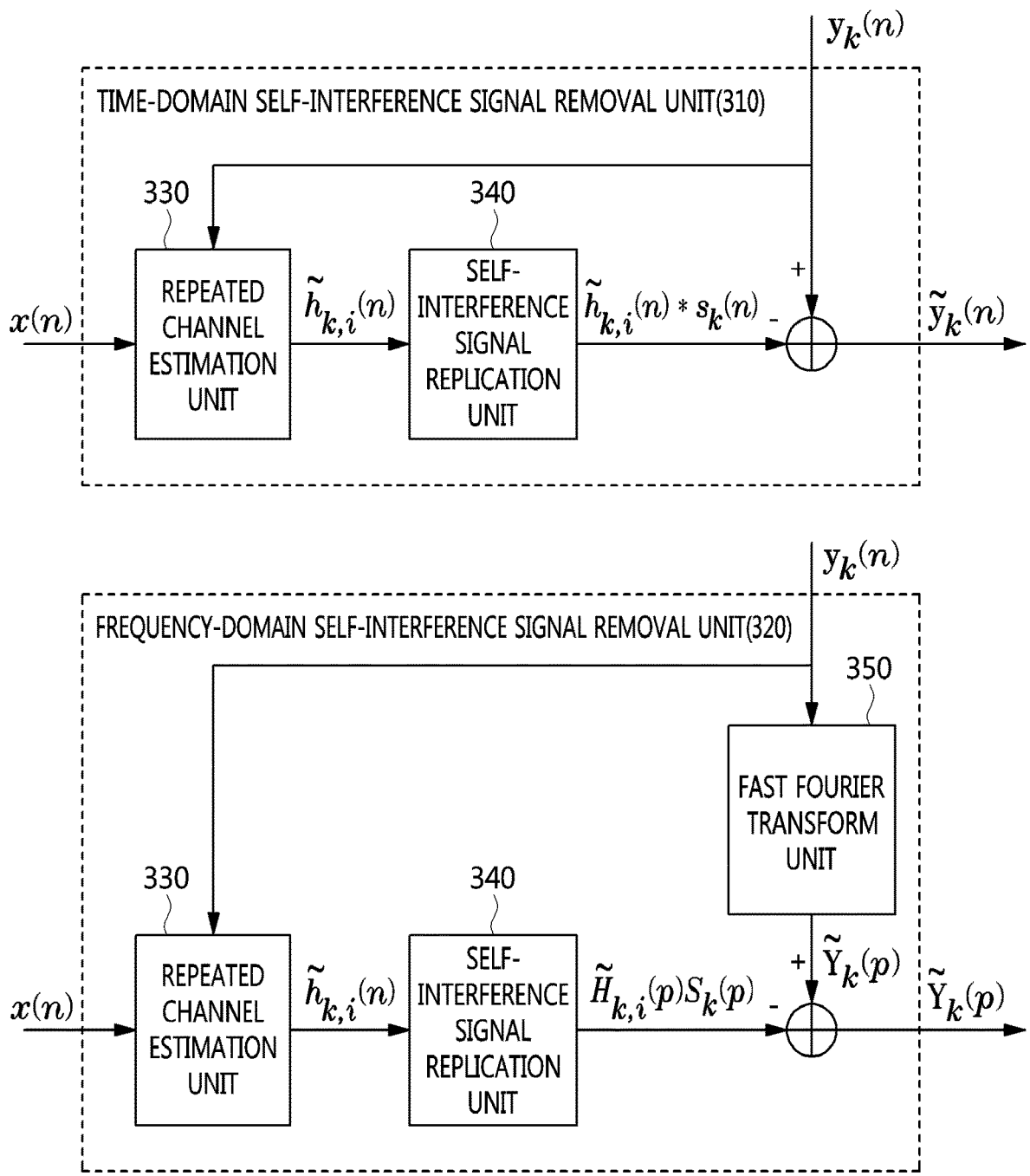
FIG. 6 is a block diagram specifically illustrating an example of the self-interference signal removal unit illustrated in FIG. 3.
Figure 7:
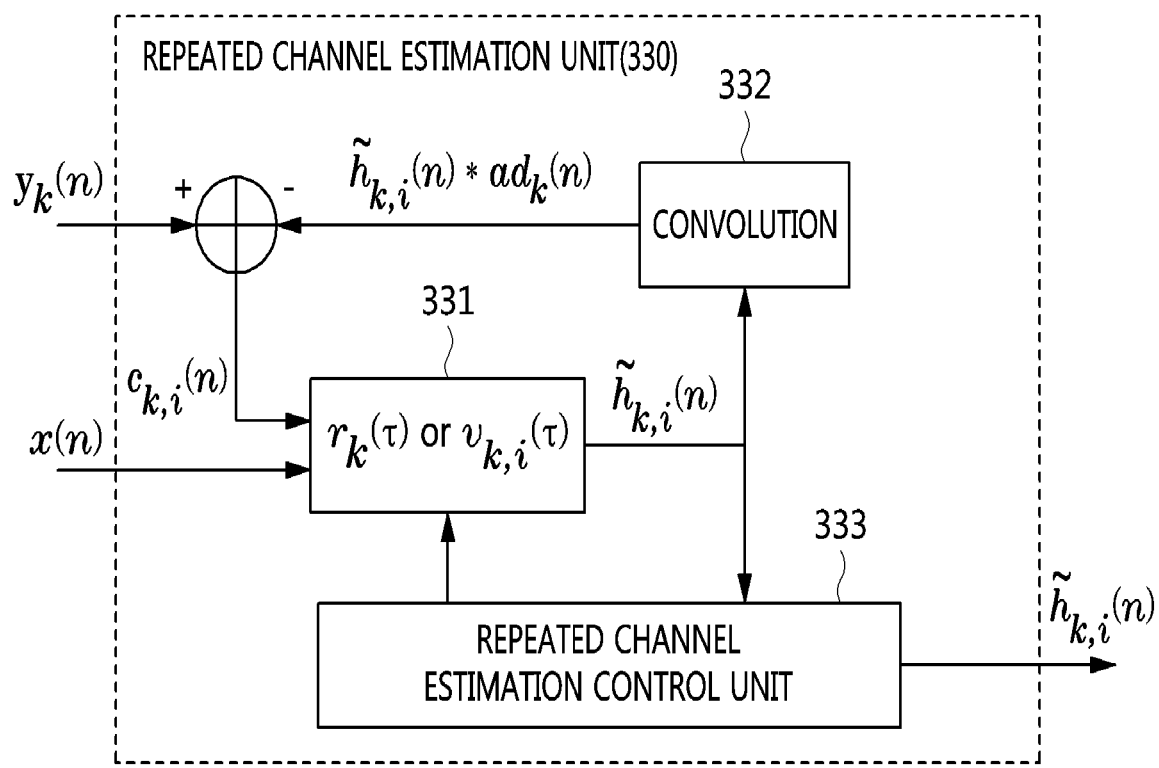
FIG. 7 is a block diagram specifically illustrating an example of the repeated channel estimation unit illustrated in FIG. 6.
Figure 8:
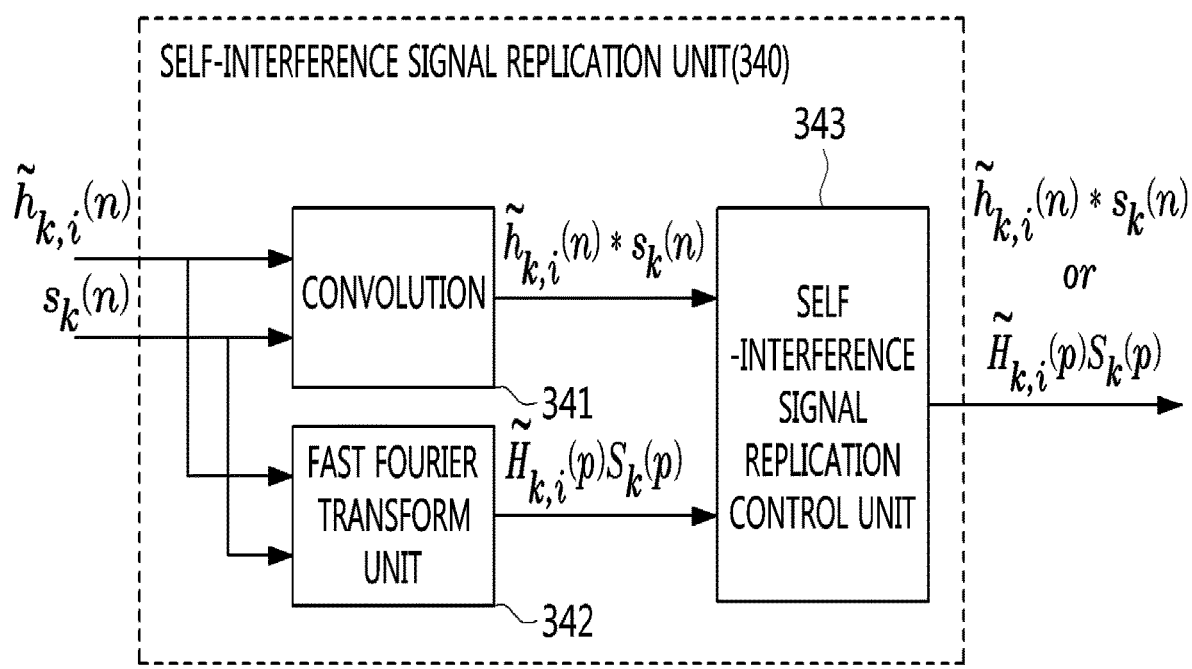
FIG. 8 is a block diagram specifically illustrating an example of the self-interference signal replication unit illustrated in FIG. 6.

FIG. 3 is a block diagram illustrating an apparatus for removing a self-interference signal according to an embodiment of the present invention. FIG. 4 is a block diagram specifically illustrating an example of the signal generation unit illustrated in FIG. 3. FIG. 5 is a block diagram specifically illustrating an example of the self-interference signal removal unit that receives a signal from the signal reception unit illustrated in FIG. 3. FIG. 6 is a block diagram specifically illustrating an example of the self-interference signal removal unit illustrated in FIG. 3. FIG. 7 is a block diagram specifically illustrating an example of the repeated channel estimation unit illustrated in FIG. 6. FIG. 8 is a block diagram specifically illustrating an example of the self-interference signal replication unit illustrated in FIG. 6.

Referring to FIG. 3, the apparatus for removing a self-interference signal according to an embodiment of the present invention includes a signal reception unit 100, a signal generation unit 200, and a self-interference signal removal unit 300.

The signal reception unit 100 may receive an upstream signal.

The signal generation unit 200 may generate a downstream signal.

Referring to FIG. 4, the signal generation unit 200 may include a downstream signal generation unit 201, a channel estimation signal generation unit 202, and a gain control unit 203.

The downstream signal generation unit 201 may generate a downstream signal based on the DOCSIS 3.1 standard.

The channel estimation signal generation unit 202 may generate a channel estimation signal from a Zadoff-Chu sequence using downstream signal parameters.

Here, the channel estimation signal generation unit 202 may alternatively use a code having a good correlation characteristic, rather than the Zadoff-Chu sequence.

The gain control unit 203 receives the downstream signal based on the DOCSIS 3.1 standard and the channel estimation signal as input, thereby controlling the gain such that the average power of the two signals is constant.

Here, the gain control unit 203 may output the addition of the two signals having the adjusted gain, represented in Equation (6), as the downstream signal.

The self-interference signal removal unit 300 may remove the self-interference signal from the upstream signal and the downstream signal.

Referring to FIG. 5, the self-interference signal removal unit 300 receives the downstream signal 301 and the signal 303 received in such a way that the downstream signal 301 and the upstream signal 302 in the same frequency band pass through a circulator.

Here, the signal 303 may be represented as shown in Equation (8).

Referring to FIG. 6, the self-interference signal removal unit 300 may include a time-domain self-interference signal removal unit 310 and a frequency-domain self-interference signal removal unit 320.

The time-domain self-interference signal removal unit 310 and the frequency-domain self-interference signal removal unit 320 may include the same structure of a repeated channel estimation unit 330 and the same structure of a self-interference signal replication unit 340.

Here, the frequency-domain self-interference signal removal unit 320 may further include a fast Fourier transform unit 350.

Referring to FIG. 7, the repeated channel estimation unit 330 may include an autocorrelation unit 331, a repeated channel estimation convolution unit 332, and a repeated channel estimation control unit 333.

The autocorrelation unit 331 receives the received signal 303 and the output of the channel estimation signal generation unit 202 as input, thereby estimating a channel impulse response, as represented in Equation (9).

The repeated channel estimation convolution unit 332 may receive the estimated channel impulse response and the downstream signal based on DOCSIS 3.1.

The autocorrelation unit 331 receives the difference between the output of the repeated channel estimation convolution unit 332 and the received signal 303 as input, thereby repeatedly estimating the channel impulse response, as represented in Equation (12).

Here, when the power of the estimated channel impulse response has a value equal to or less than a specific threshold value, the autocorrelation unit 331 sets the value to 0, which may be represented as the conditional expression of Equation (15):

$$\tilde{h}_{k,i}(n) = \begin{cases} \tilde{h}_{k,i}(n) & |\tilde{h}_{k,i}(n)|^2 \geq P_T \\ 0 & |\tilde{h}_{k,i}(n)|^2 < P_T \end{cases}, \quad (15)$$

$$n = 0, \ldots, N_z - 1$$

The repeated channel estimation control unit 333 may control parameters related to the number of times the output of the autocorrelation unit 331 is accumulated and the number of repetitions of channel estimation and output the finally estimated channel impulse response value.

Referring to FIG. 8, the self-interference signal replication unit 340 may include a self-interference signal replication convolution unit 341, a self-interference signal replication fast Fourier transform unit 342, and a self-interference signal replication control unit 343.

The self-interference signal replication convolution unit 341 may perform convolution by receiving the output of the repeated channel estimation unit 330 and the downstream signal 301.

The self-interference signal replication fast Fourier transform unit 342 may perform fast Fourier transform by receiving the output of the repeated channel estimation unit 330 and the downstream signal 301.

The self-interference signal replication control unit 343 receives the output of the self-interference signal replication convolution unit 341 and the output of the self-interference signal replication fast Fourier transform unit 342 as input, thereby outputting a replicated self-interference signal in a preset time or frequency domain.

Here, the time-domain self-interference signal removal unit 310 outputs the difference between the received signal and the replicated self-interference signal in the time domain, thereby outputting the received signal in the time domain from which the self-interference signal in the time domain is removed.

Here, the frequency-domain self-interference signal removal unit 320 outputs the difference between the result of Fourier transform performed on the received signal and the replicated self-interference signal in the frequency domain, thereby outputting the received signal in the frequency domain from which the self-interference signal in the frequency domain is removed.

Figure 9:
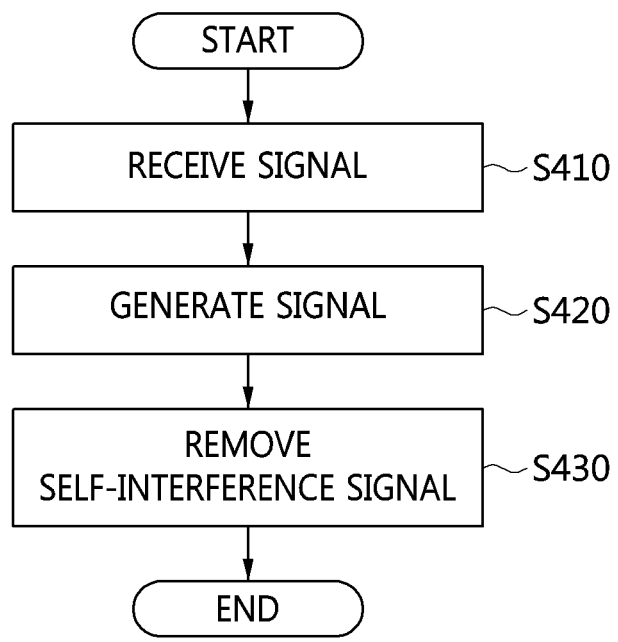
FIG. 9 is a flowchart illustrating a method for removing a self-interference signal according to an embodiment of the present invention.
Figure 10:
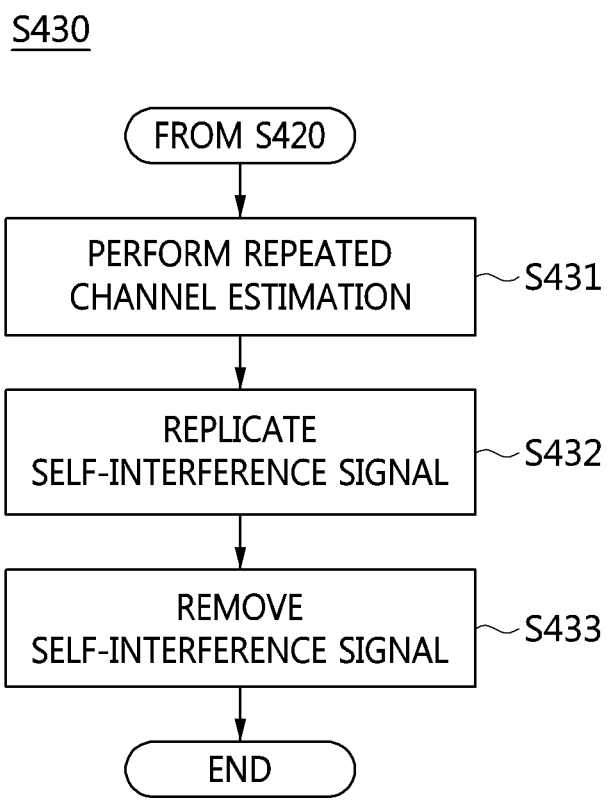
FIG. 10 is a flowchart specifically illustrating an example of the step of removing a self-interference signal illustrated in FIG. 9.
Figure 11:
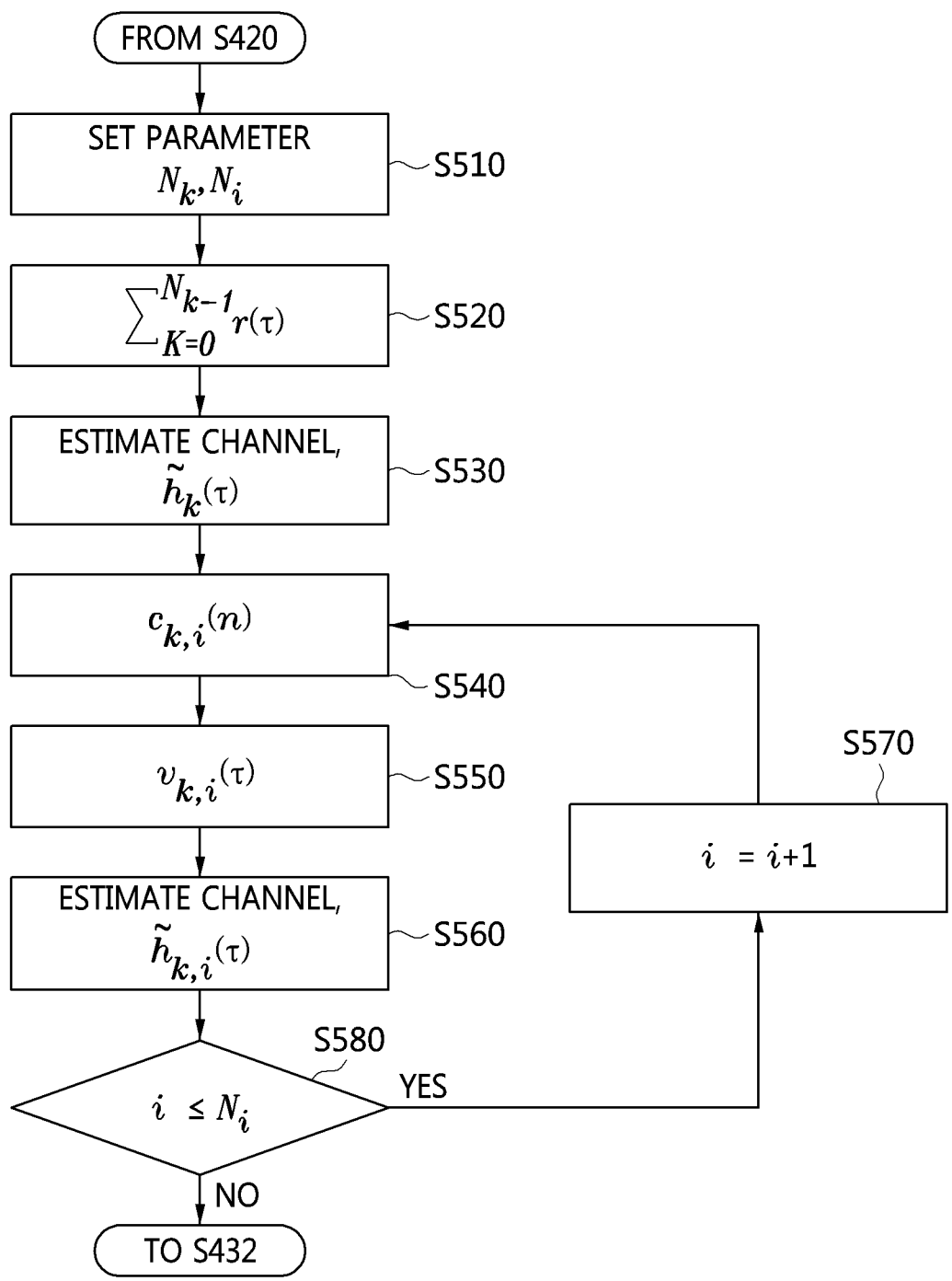
FIG. 11 is a flowchart specifically illustrating an example of the step of repeatedly estimating a channel illustrated in FIG. 10.

FIG. 9 is a flowchart illustrating a method for removing a self-interference signal according to an embodiment of the present invention. FIG. 10 is a flowchart specifically illustrating an example of the step of removing a self-interference signal illustrated in FIG. 9. FIG. 11 is a flowchart specifically illustrating an example of the step of repeatedly estimating a channel, illustrated in FIG. 10.

Referring to FIG. 9, in the method for removing a self-interference signal according to an embodiment of the present invention, first, a signal may be received at step S410.

That is, an upstream signal may be received at step S410.

Also, in the method for removing a self-interference signal according to an embodiment of the present invention, a signal may be generated at step S420.

That is, a downstream signal may be generated at step S420.

Here, a downstream signal based on the DOCSIS 3.1 standard may be generated at step S420.

Here, at step S420, a channel estimation signal may be generated from a Zadoff-Chu sequence using downstream signal parameters.

Here, at step S420, any code having a good correlation characteristic may be used in place of the Zadoff-Chu sequence.

Here, at step S420, the downstream signal based on the DOCSIS 3.1 standard and the channel estimation signal are input, and gain may be adjusted such that the average power of the two signals is constant.

Here, at step S420, the addition of the two signals having the adjusted gain, which is represented as Equation (6), may be output as the downstream signal 301.

Also, in the method for removing a self-interference signal according to an embodiment of the present invention, a self-interference signal may be removed at step S430.

That is, at step S430, the self-interference signal may be removed from the upstream signal and the downstream signal.

Here, at step S430, the downstream signal 301 and the signal 303 received in such a way that the downstream signal 301 and the upstream signal 302 in the same frequency band pass through a circulator may be input.

Referring to FIG. 10, at step S430, first, repeated channel estimation may be performed at step S431.

Here, at step S431, the received signal 303 and the output of the channel estimation signal generation unit 202 are received as input, whereby a channel impulse response may be estimated as represented in Equation (9).

Here, at step S431, the estimated channel impulse response and the downstream signal based on DOCSIS 3.1 may be received.

Here, at step S431, the difference between the output of the repeated channel estimation convolution unit 332 and the received signal 303 is received as input, whereby the channel impulse response may be repeatedly estimated as represented in Equation (12).

Here, at step S431, when the power of the estimated channel impulse response has a value equal to or less than a specific threshold value, the value is set to 0, which may be represented as the conditional expression of Equation (15).

Here, at step S431, parameters related to the number of times the output of the autocorrelation unit 331 is accumulated and the number of repetitions of channel estimation are controlled, and the finally estimated channel impulse response value may be output.

Referring to FIG. 11, at step S431, first, parameters may be set at step S510.

Here, $N_k$ and $N_i$ are the number of times the output of the autocorrelation unit 331 is accumulated and the number of repetitions of channel estimation.

At step S510, the parameters related to the number of times the output of the autocorrelation unit 331 is accumulated and the number of repetitions of channel estimation may be set.

At steps S520 and S530, based on Equation (15), a channel may be estimated using the number of times the output of the autocorrelation unit 331 is accumulated.

At step S540, the difference between the output of the repeated channel estimation convolution unit 332 and the received signal 303 may be input.

At step S550, the channel may be estimated at step S560 from the value input at step S540 using the autocorrelation function of Equation (12).

At steps S570 and S580, the difference between the output of the repeated channel estimation convolution unit 332 and the received signal 303, acquired at step S540, may be input again depending on the preset number of repetitions of channel estimation, whereby channel estimation may be repeatedly performed.

Referring again to FIG. 10, at step S430, the self-interference signal may be replicated at step S432.

That is, at step S432, the output of the repeated channel estimation unit 330 and the downstream signal 301 are input, and convolution may be performed.

Here, at step S432, the output of the repeated channel estimation unit 330 and the downstream signal 301 are input, and fast Fourier transform may be performed.

Here, at step S432, the output of the self-interference signal replication convolution unit 341 and the output of the self-interference signal replication fast Fourier transform unit 342 are input, and the replicated self-interference signal in the preset time or frequency domain may be output.

Also, at step S430, the self-interference signal may be removed at step S433.

That is, at step S433, the self-interference signal in the time domain and the self-interference signal in the frequency domain may be removed from the received signal.

Here, at step S433, the difference between the received signal and the replicated self-interference signal in the time domain is output, whereby the received signal in the time domain from which the self-interference signal in the time domain is removed may be output.

Here, at step S433, the difference between the result of Fourier transform performed on the received signal and the replicated self-interference signal in the frequency domain is output, whereby the received signal in the frequency domain from which the self-interference signal in the frequency domain is removed may be output.

Hereinafter, an example of a simulation performed in order to check the echo channel estimation performance of the apparatus and method for removing a self-interference signal according to an embodiment of the present invention is described. Table 1 shows the definition of upstream and downstream parameters related to the simulation.

TABLE 1

| parameter | downstream | upstream |
|---|---|---|
| sampling clock | 204.8 MHz | |
| fast Fourier transformer size | 4,096 | |
| interval of subcarrier | 50 kHz | |
| cyclic prefix length | 256 (1.25 μsec) | |
| OFDM symbol length | 21.25 μsec | |
| number of OFDM symbols/OFDM frame | 128 | |
| modulation order | 1024 QAM | |
| downstream/upstream bandwidth | 192 MHz | 96 MHz |
| number of subcarriers that are used | 3840 | 1920 |
| power | 0 dB | −10 dB |
| Signal-to-Noise Ratio | −50 dB | |

Table 2 shows parameters related to a Zadoff-Chu sequence for channel estimation.

TABLE 2

| parameter | value |
|---|---|
| root | 1 |
| length | 256 |
| power | −12 dB |

Table 3 shows parameters related to an echo channel. The echo channel relates only to a downstream transmission signal, and an ideal channel environment is assumed in the case of an upstream transmission signal.

TABLE 3

| delay time (ns) | power (dB) | phase (rad) |
|---|---|---|
| 0 | 0 | 0.5 |
| 410 | −21 | 0.4 |
| 800 | −30 | 0.95 |

It is assumed that channel estimation based on a single downstream OFDM frame and removal of a self-interference signal are performed. The modulation error ratio (MER) of the upstream signal, received after the self-interference signal is removed, is calculated, whereby the performance of removal of the self-interference signal is measured. Equation (16) represents the definition of the modulation error ratio.

$$MER = 10 \log_{10} \frac{E\{|U_k|^2\}}{E\{|\tilde{Y}_k - U_k|^2\}} \quad (16)$$

Here, $U_k$ denotes the upstream signal, and k denotes the signal received after the self-interference signal is removed.

Table 4 shows a modulation error ratio for an upstream signal received after the self-interference signal is removed using the estimated channel impulse response and the ideal channel impulse response.

TABLE 4

| | ideal channel | estimated channel impulse response | |
|---|---|---|---|
| | impulse response | channel estimation without repetition | repeated channel estimation (once) |
| modulation error ratio (dB) | 39.546 | 30.7687 | 39.3893 |

Figure 12:
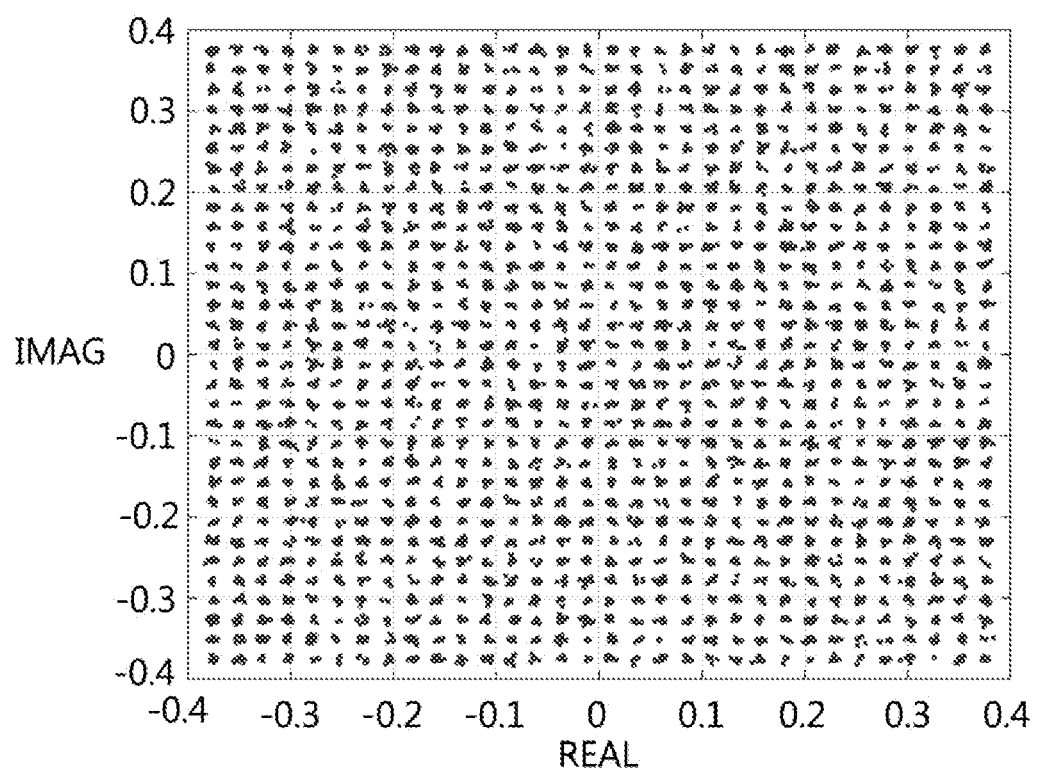
FIG. 12 is a constellation diagram illustrating an upstream signal received after a self-interference signal is removed using an estimated channel impulse response according to an embodiment of the present invention.

FIG. 12 is a constellation diagram illustrating an upstream signal received after a self-interference signal is removed using an estimated channel impulse response according to an embodiment of the present invention.

Referring to FIG. 12, it is confirmed as the result of the simulation that a self-interference signal is removed from an upstream signal through a self-interference signal removal process according to an embodiment of the present invention, as shown in the constellation diagram.

Figure 13:
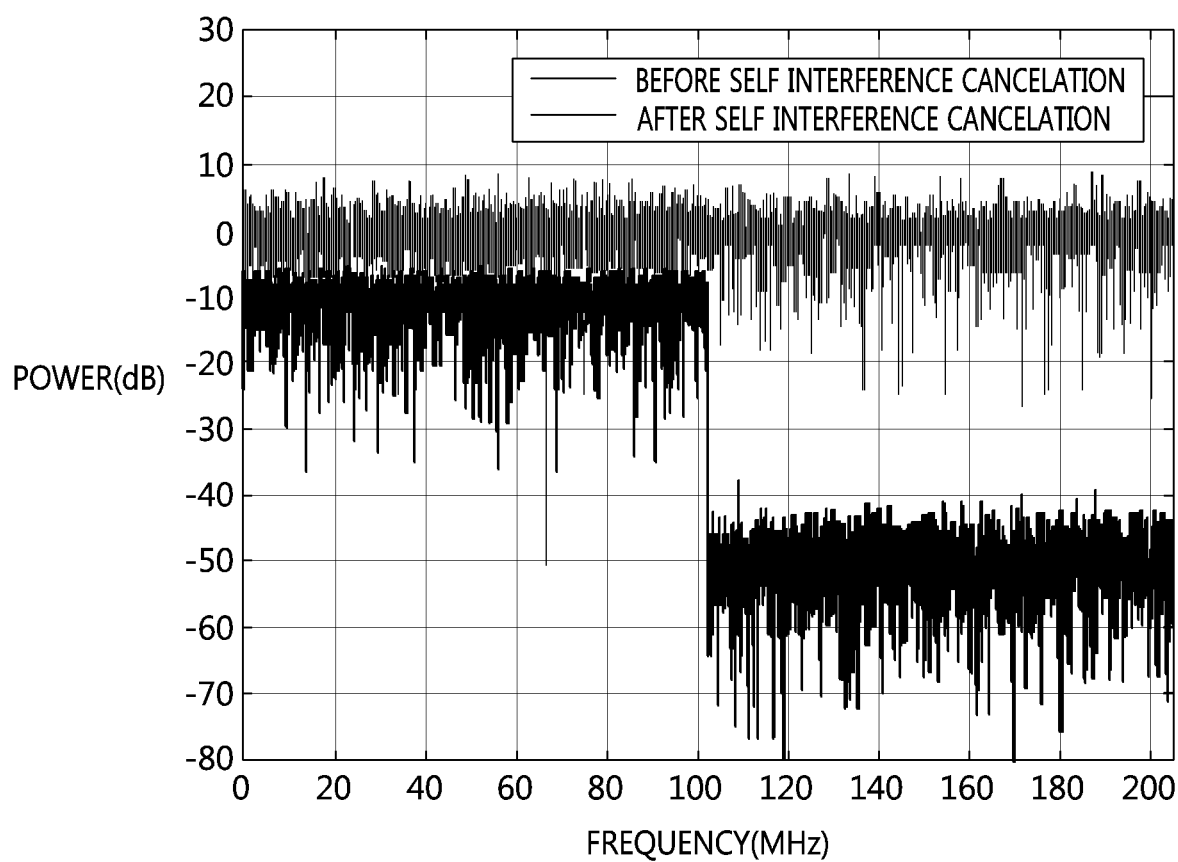
FIG. 13 is a graph illustrating a change in a frequency spectrum before and after a self-interference signal is removed according to an embodiment of the present invention.

FIG. 13 is a graph illustrating a change in a frequency spectrum before and after removal of a self-interference signal according to an embodiment of the present invention.

Referring to FIG. 13, it is confirmed through a change in the spectrum that, as the result of the simulation, a self-interference signal is removed through a self-interference signal removal process according to an embodiment of the present invention.

Figure 14:
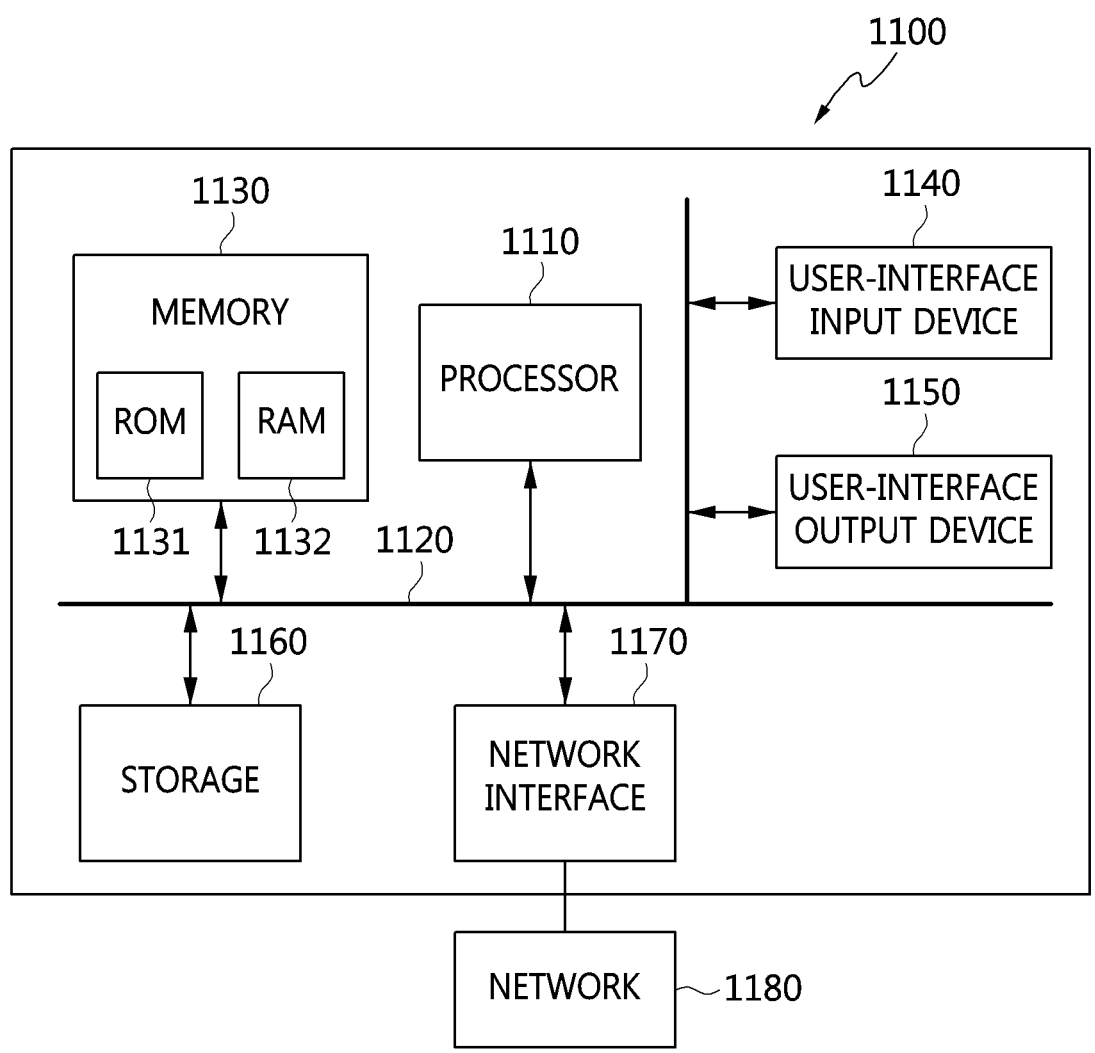
FIG. 14 is a view illustrating a computer system according to an embodiment of the present invention.

FIG. 14 is a view illustrating a computer system according to an embodiment of the present invention.

Referring to FIG. 14, the apparatus for removing a self-interference signal according to an embodiment of the present invention may be implemented in a computer system 1100 including a computer-readable recording medium. As illustrated in FIG. 14, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected with a network 1180. The processor 1110 may be a central processing unit or a semiconductor device for executing processing instructions stored in the memory 1130 or the storage 1160. The memory 1130 and the storage 1160 may be any of various types of volatile or nonvolatile storage media. For example, the memory may include ROM 1131 or RAM 1132.

The apparatus for removing a self-interference signal according to an embodiment of the present invention includes one or more processors 1110 and executable memory 1130 for storing at least one program executed by the one or more processors 1110. The at least one program receives an upstream signal for removing self-interference, generates a downstream signal for channel estimation, replicates a self-interference signal in the time domain and a self-interference signal in the frequency domain using the upstream signal and the downstream signal, and removes the self-interference signal from the upstream signal using the replicated self-interference signal in the time domain and the replicated self-interference signal in the frequency domain.

Here, the downstream signal may have an autocorrelation characteristic for channel estimation.

Here, the upstream signal and the downstream signal may be combined through a circulator.

Here, at least one program may estimate a channel impulse response from the signal in which the upstream signal and the downstream signal are combined.

Here, the at least one program performs convolution on the channel impulse response and the downstream signal and again receives the difference value between the output value acquired by performing convolution and the signal in which the upstream signal and the downstream signal are combined, thereby repeatedly estimating the channel impulse response.

Here, the at least one program performs convolution on the estimate of the channel impulse response and the downstream signal, thereby replicating the self-interference signal in the time domain.

Here, the at least one program performs Fourier transform on the estimate of the channel impulse response and the downstream signal, thereby replicating the self-interference signaling the frequency domain.

The present invention may remove a self-interference signal through channel estimation even when an upstream signal is received.

As described above, the apparatus and method for removing a self-interference signal according to the present invention are not limitedly applied to the configurations and operations of the above-described embodiments, but all or some of the embodiments may be selectively combined and configured, so that the embodiments may be modified in various ways.

What is claimed is:

1. An apparatus for removing a self-interference signal, comprising:
   one or more processors; and
   executable memory for storing at least one program executed by the one or more processors,
   wherein the at least one program receives an upstream signal for removing self-interference, generates a downstream signal for channel estimation, replicates a self-interference signal in a time domain and a self-interference signal in a frequency domain using the upstream signal and the downstream signal, and removes the self-interference signal from the upstream signal using the replicated self-interference signal in the time domain and the replicated self-interference signal in the frequency domain,
   wherein the downstream signal has an autocorrelation characteristic for channel estimation,
   wherein the upstream signal and the downstream signal are combined through circulator, and
   wherein the at least one program estimates a channel impulse response from a signal in which the upstream signal and the downstream signal are combined, performs convolution on the channel impulse response and the downstream signal and again receives a difference value between an output value acquired by performing convolution and the signal in which the upstream signal and the downstream signal are combined, thereby repeatedly estimating the channel impulse response.

2. The apparatus of claim 1, wherein the at least one program replicates the self-interference signal in the time domain by performing convolution on an estimate of the channel impulse response and the downstream signal.

3. The apparatus of claim 2, wherein the at least one program replicates the self-interference signal in the frequency domain by performing Fourier transform on the estimate of the channel impulse response and the downstream signal.

4. A method for removing a self-interference signal, performed by an apparatus for removing the self-interference signal, comprising:
   receiving an upstream signal for removing self-interference;
   generating a downstream signal for channel estimation; and
   replicating a self-interference signal in a time domain and a self-interference signal in a frequency domain using the upstream signal and the downstream signal, and removing the self-interference signal from the upstream signal using the replicated self-interference signal in the time domain and the replicated self-interference signal in the frequency domain,
   wherein the downstream signal has an autocorrelation characteristic for channel estimation,
   wherein the upstream signal and the downstream signal are combined through a circulator and
   wherein removing the self-interference signal includes:
      estimating a channel impulse response from a signal in which the upstream signal and the downstream signal are combined; and
      performing convolution on the channel impulse response and the downstream signal and to again receive a difference value between an output value acquired by performing convolution and the signal in which the upstream signal and the downstream signal are combined, thereby repeatedly estimating the channel impulse response.

5. The method of claim 4, wherein removing the self-interference signal is configured to replicate the self-interference signal in the time domain by performing convolution on an estimate of the channel impulse response and the downstream signal.

6. The method of claim 5, wherein removing the self-interference signal is configured to replicate the self-interference signal in the frequency domain by performing Fourier transform on the estimate of the channel impulse response and the downstream signal.

* * * * *